United States Patent [19]

Auvray et al.

[11] Patent Number: 5,036,391
[45] Date of Patent: Jul. 30, 1991

[54] SYNCHRONIZATION METHOD FOR THE TRANSMISSION, OF AN ASYNCHRONOUS CHANNEL, OR A SERIES OF PICTURES ENCODED BY MEANS OF A VARIABLE LENGTH CODE, AND DEVICE FOR THE IMPLEMENTATION OF THIS METHOD

[75] Inventors: Eric Auvray, Orvault; Claude Perron, Rennes, both of France

[73] Assignee: Thomson Consumer Electronics, Courbevoie, France

[21] Appl. No.: 408,510

[22] PCT Filed: Dec. 30, 1988

[86] PCT No.: PCT/FR88/00650
§ 371 Date: Aug. 25, 1989
§ 102(e) Date: Aug. 25, 1989

[87] PCT Pub. No.: WO89/06471
PCT Pub. Date: Jul. 13, 1989

[30] Foreign Application Priority Data
Dec. 30, 1987 [FR] France ............................... 87 18372

[51] Int. Cl.⁵ .............................................. H04N 7/12
[52] U.S. Cl. ..................................... 358/133; 358/141
[58] Field of Search ............... 358/141, 142, 133, 135, 358/136, 148

[56] References Cited
U.S. PATENT DOCUMENTS 3,553,362 1/1971 Mounts .
4,517,596 5/1985 Suzuki ........................... 358/138 X
4,541,012 9/1985 Tescher .
4,562,466 12/1985 Clapp et al. .
4,660,079 4/1987 Devimeux et al. .
4,707,738 11/1987 Ferre et al. .
4,731,664 3/1988 Nishiwaki et al. ................... 358/133

FOREIGN PATENT DOCUMENTS 0084270 7/1983 European Pat. Off. .
0103380 3/1984 European Pat. Off. .
0141721 5/1985 European Pat. Off. .

OTHER PUBLICATIONS

Electronics and Communications in Japan, vol. 59-A, No. 11, Nov. 1976 Y. Sato et al., pp. 51-60.
Bell System Technical Journal, vol. 54, No. 8, Oct. 1975, American Telephone and Telegraph Company, (US).
European Broadcasting Union, Technical 3258, E, Oct. 1986, Technical Centre, Brussels, BE.

Primary Examiner—Victor R. Kostak
Attorney, Agent, or Firm—Cushman, Darby & Cushman

[57] ABSTRACT

The synchronization method, consists in transmitting, in addition to the data:

inter-block separators, for separating the data corresponding to separate blocks, each inter-block separator comprising: a fixed radical, a first binary word representing the rank of a block of picture elements associated with this separator, and a second binary word representing the sum of this rank and of the number of events which are encoded by the data corresponding to the block associated with this separator;

picture separators, for separating the data corresponding to successive pictures, each picture separator being repeated several times and comprising a fixed radical followed by a binary word indicating the rank of the separator in the repetitions;

synchronization patterns at the picture line frequency and synchronization patterns at the picture frequency, transmitted while interrupting the transmission of the data and of the separators.

application to the transmission of digital video pictures on an asynchronous channel.

6 Claims, 5 Drawing Sheets

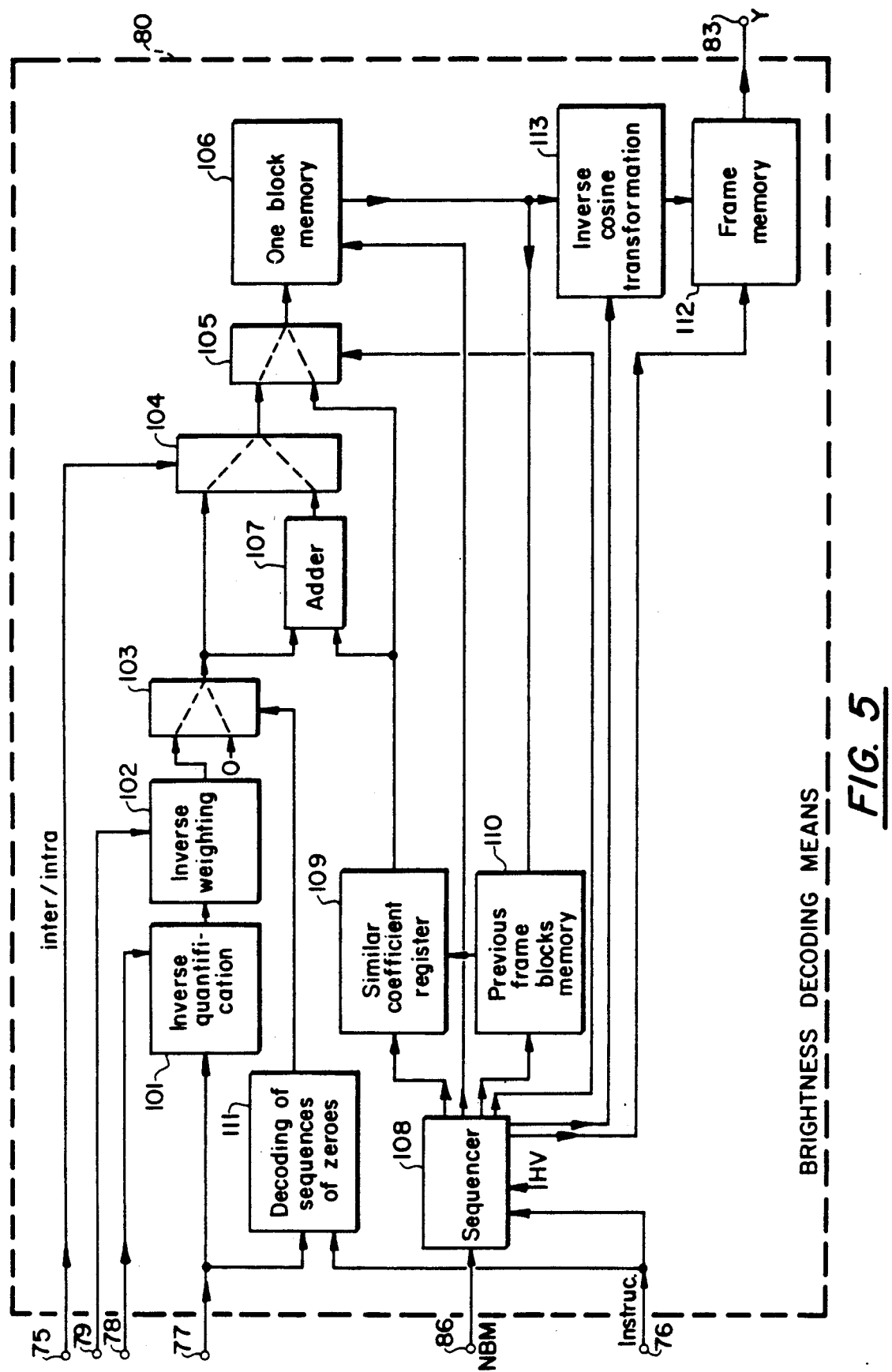

SYNCHRONIZATION METHOD FOR THE TRANSMISSION, OF AN ASYNCHRONOUS CHANNEL, OR A SERIES OF PICTURES ENCODED BY MEANS OF A VARIABLE LENGTH CODE, AND DEVICE FOR THE IMPLEMENTATION OF THIS METHOD

BACKGROUND OF THE INVENTION

1. Field of the Invention

The invention relates to a synchronization method for the transmission, on an asynchronous channel, of a series of pictures encoded by means of a variable length code, and a device for the implementation of this method. Such a method enables, for example, the transmission of digital video pictures on an asynchronous channel distributing these pictures to subscribers.

In the future, the distribution of video pictures will be carried out in digital form, by means of encoding methods providing a very high reduction in the information data rate, in particular methods of encoding by blocks of picture elements implementing a two-dimensional transformation such as the cosine transformation; and implementing a variable length encoding such as Huffmann encoding. The synchronization of the channel with the sampling frequency of the video pictures is not possible in practice as there are numerous sources of video signals which are independent from each other and which are independent from the transmission channel. It is therefore necessary to use a synchronization method enabling, on decoding, the recovery of the video sampling frequency and enabling the restitution of the pictures while limiting, as much as possible, the degradations due to transmission errors affecting the synchronization signals.

Furthermore, it is necessary to be able to distinguish the encoded data corresponding to each picture and the encoded data corresponding to each block within a picture.

The encoded data corresponding to each block of picture elements can be distinguished by means of separators called inter-block separators, and the encoded data corresponding to each picture can be distinguished by means of separators called picture separators, but a consequence of the use of variable length codes is that these separators do not have a constant position in the flow of binary data transmitted and it is not therefore possible to recover the sampling rate of the video pictures using a method of the filtering type. A first object of the invention is therefore to propose a synchronization method enabling the recovery of the sampling frequency of the video pictures, and enabling the various types of encoded data to be distinguished.

2. Description of the Prior Art

High performance encoding methods generally include a differential encoding stage for the blocks of picture elements whose brightness and colour differences have varied little with respect to the similar block in the immediately previous picture. This differential encoding stage enables a high reduction in the quantity of information to be transmitted but has the disadvantage of making a transmission error affecting one block catastrophic. In effect, if a series of similar blocks in the series of pictures is transmitted using this differential encoding and if an error affects the first block of the series, this entire series of similar blocks will be restituted erroneously. Furthermore, the absence of detection of an inter-block separator can affect the position of all of the blocks which follow and can therefore cause a shifting of the blocks of the restituted picture. And, if the following pictures are encoded using a differential encoding referring to the erroneous picture, they also will be restituted erroneously. Another object of the invention is therefore to propose a synchronization method avoiding the consequences of a transmission error in the synchronization signals propagating from one block to another in a same restituted picture and propagating in the series of restituted pictures.

SUMMARY OF THE INVENTION

According to the invention, a synchronization method for the transmission, on an asynchronous channel, of a series of pictures encoded by means of a variable length code, is characterized in that it consists in transmitting, in addition to the data, separators called inter-block separators, for separating the data corresponding to separate blocks, and separators called picture separators for separating the data corresponding to successive pictures; and in that it furthermore consists in transmitting first synchronization patterns at the picture line frequency and second synchronization patterns at the picture frequency, while interrupting the transmission of the data and the separators; the separators being such that they cannot be imitated by licit concatenations of data and/or separators.

BRIEF DESCRIPTION OF THE DRAWINGS

The invention will be better understood and other details will appear with the help of the following description and of the accompanying figures in which:

FIGS. 4 and 5 show the block diagram of an embodiment of a decoding device comprising a synchronization device for the implementation of the method according to the invention.

DESCRIPTION OF THE PREFERRED EMBODIMENTS

In an example of implementation, the series of pictures is constituted by a series of colour television frames, sampled and digitized. Each picture element is represented by a brightness value, a red colour difference value and a blue difference value. Each television picture to be encoded is constituted by two interlaced frames analysed in a conventional way by a television camera. The two frames are separately encoded.

Figure 1:
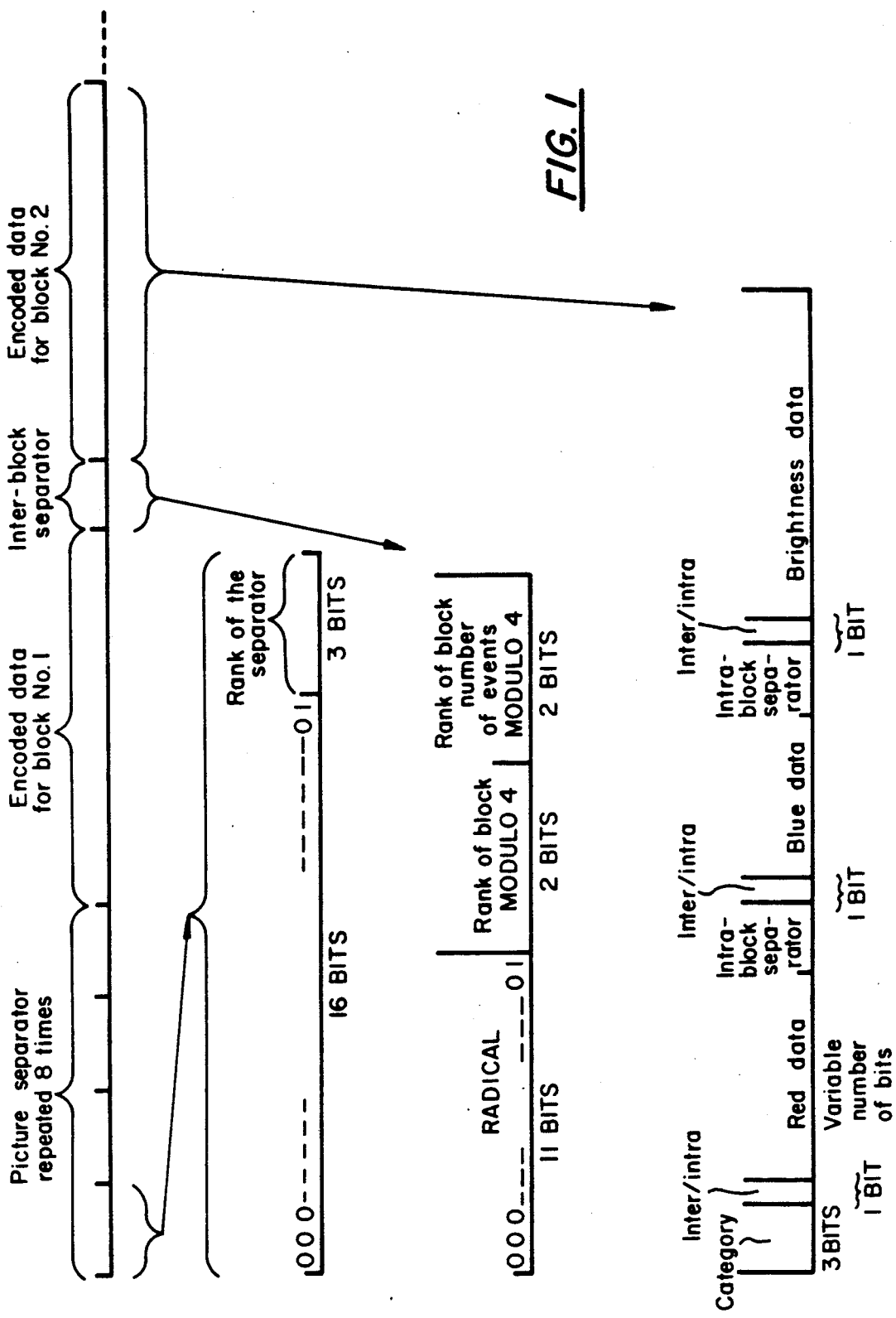
FIG. 1 shows the synchronization signals of an encoding device and of a decoding device in an example of implementation of the method according to the invention.

FIG. 1 shows, in its upper section, the format of the binary information transmitting a series of pictures encoded in blocks of picture elements, by means of a two-dimensional transformation and by means of variable length codes. For example the encoding method consists in:

dividing each frame into blocks of picture elements, each block being represented by a block of 16×16 brightness values, a block of 16×8 blue colour difference values, and a block of 16×8 red colour difference values;

applying the two-dimensional cosine transformation to each block of values in order to obtain a block of transformation coefficients of the block of values in question;

transmitting, for each block of values: either the value of the transformation coefficients of the block, or the difference in value of these transformation coefficients, with respect to the value of the transformation coefficients of a similar block in the frame of the same parity preceding the frame being encoded, in order to minimize the quantity of information to be transmitted for the block in question; the encoding being called intra-picture or inter-picture encoding respectively; and the type of encoding being able to be different for the three types of values representing a same block of picture elements.

The encoding furthermore consists in multiplying the transformation coefficients and the differences of transformation coefficients, before their transmission, by a coefficient called a weighting coefficient, favouring the low spatial frequencies of the pictures and which varies as a function of the quantity of information to be transmitted. The weighted coefficients are then quantified according to a linear scale whose pitch is variable as a function of the quantity of information to be transmitted. This is equivalent to multiplying the weighted coefficients by a coefficient called the quantification coefficient which is variable as a function of the quantity of information to be transmitted, retaining only the whole part of the result of the multiplication. Then the transformation coefficients of the differences of transformation coefficients are transmitted by Huffmann codes, i.e. code words having a variable length, the shortest code words being used for encoding the events which are statistically the most frequent.

It should be noted that the blocks of transformation coefficients and the blocks of differences of transformation coefficients include numerous zero values. In particular, when the coefficients or the differences of coefficients are scanned in an order where the transformation coefficients have statistically decreasing values, the last coefficients or differences of coefficients form a long sequence of zeroes. In order to take advantage of this fact, zero values are encoded in sequences, the length of each sequence being transmitted by a Huffmann code. The last sequence of zeroes of each block is not encoded, as the encoded data of each block are separated from the others by a inter-block separator which therefore enables the recognition of the end of the non-zero values in a block. It should also be noted that the value of the coefficient or the difference of transformation coefficients having the lowest line index and the lowest column index in each block is not encoded by a Huffmann code but it transmitted in clear, as this value is particularly important for a good restitution of the block of picture elements. This avoids a quantification error which is variable as a function of the quantity of information to be transmitted.

Conversely, the decoding consists, for each block, in:
recognizing each of the Huffmann code words and in recovering a transformation coefficient value or a difference of transformation coefficients value;

multiplying each value of transformation coefficient or of difference of transformation coefficients by a coefficient equal to the inverse of the weighting coefficient used for the encoding and by a coefficient equal to the inverse of the quantification coefficient used for the encoding;

adding, to the value of each difference of transformation coefficients, the value of a transformation coefficient, similar to the coefficient in question in a similar block to the block in question and belonging to the frame of the same parity preceding the frame being decoded;

applying to each transformation coefficient a two-dimensional inverse cosine transformation, in order to obtain a block of values of brightness or of colour differences, representing a portion of the decoded picture.

In the example of the method of encoding and decoding which is considered here in order to illustrate the implementation of the synchronization method, the weighting coefficient and the quantification coefficient are furthermore functions of a parameter called the category of the block which represents the difficulty of encoding the block in question. When a block is difficult to encode, i.e., when it is very sensitive to encoding errors, this parameter commands a reduction in the severity of weighting and of the quantification in order to reduce the errors due to the encoding and to the decoding. The blocks considered as difficult to encode are those which include an extended dark zone which overlaps the boundary between the block in question and another block. In such a dark zone the granular noise is particularly visible and reveals the boundary between the two blocks if the encoding reduces too much the quantity of information corresponding to the details of the picture.

FIG. 1 shows the encoded data obtained on applying the encoding method described above and shows the data separators which are inserted between these data in order to distinguish the nature of the various packets of encoded data which are transmitted in series.

In order to recover the frequency called the video frequency of the picture sampling, two types of synchronization pattern are transmitted independently from the encoded data and their separators, while freezing the transmission of these encoded data. A picture synchronization pattern is transmitted at a frequency of 25 Hz, before the encoded data of each even frame; and a line synchronization pattern is transmitted at the frequency of 15,625 Hz; in order to slave a clock to the picture elements sampling frequency. These two types of synchronization pattern do not have a fixed position with respect to the encoded data and are not shown in FIG. 1.

These two types of synchronization pattern do not have to be such that they cannot be imitated by concatenations of data, because these patterns are separated by a given number of bits, to the nearest 1 bit. A learning process, consisting in checking the presence of successive patterns at times provided for this, enables them to be distinguished from data.

In FIG. 1, the encoded data corresponding to two frames are preceded by a picture separator which is repeated eight times in this example. Each picture separator comprises a 16-bit radical comprising 15 zeroes and one 1; and includes a 3-bit binary word giving the rank of the separator among the eight separators. In practice, the number of repetitions is chosen as a function of the error rate in the transmission channel. The prefix is a binary word which cannot be imitated by a licit concatenation of Huffmann code words and of inter-block separator words.

The repetition of the picture separators enables them to be protected from isolated errors and small packets of errors. The detection of a picture separator is only validated if it is made several times and the exact position of the picture separators is known by means of the three bits encoding the rank of each picture separator.

The encoded data corresponding to block No. 1 are transmitted after the picture separator block repeated 8 times. Then an inter-block separator is transmitted and precedes the encoded data for block No. 2. The inter-block separator comprises an 11-bit radical comprising 10 zeroes and one 1; a two-bit binary word representing the rank of the block, modulo 4; and a two-bit binary word representing the sum modulo 4 of the rank of the block and the number of events encoded in the block following the inter-block separator. The radical thus constituted can be imitated by a licit concatenation of code words belonging to the Huffmann encoding trees. For this purpose the encoding trees comprise code words beginning with at most four 0 and terminating in at most five 0. A code word including only 0's is prohibited since, if it were repeated, there would be imitation of the inter-block separator.

The lower section of FIG. 1 shows the format of the encoded data for a block. It comprises: a three-bit binary word, called the category of the block and which is a parameter taken into account in the encoding of the block as will be explained later; a bit indicating the type of encoding, inter-picture or intra-picture, encoded data of the red colour difference signal; then these data, with a variable number of bits; then an intra-block separator constituted by a Huffmann code word; then one bit called the inter-intra bit, indicating the type of encoding of the encoded data for the blue colour difference signal; then an intra-block separator, constituted by a Huffmann code word; then a bit indicating the type of encoding for the brightness signal encoded data; then the encoded data of the brightness signal.

It should be noted that the picture separators introduce a negligible redundancy considering their rarity. The intra-block separators are essential since the last sequence of zeroes of each block is not encoded. They are not protected and they do not therefore introduce redundancy. On the other hand, there is a redundancy in the inter-block separators. According to the prior art, the inter-block separators belong to the inter-picture and intra-picture encoding trees of the brightness signal and have a length of five bits. The one used in this example of implementation has a length of 15 bits, giving a redundancy of ten bits. Furthermore, the Huffmann encoding trees of the colour difference signals include a reserved word formed of five consecutive 0's for encoding the value 0+, which increases the average length of the Huffmann codes with respect to those used in the prior art. Redundancy of information in the inter-block separators is estimated as equal to at least 1% of the total transmitted information. This redundancy is low but enables the protection against errors of inter-block separators to be considerably improved.

A good detection of inter-block separators is essential as the loss of this single bit of the encoded data causes a total loss of synchronization of the decoding with respect to the encoding and therefore causes a loss of a complete picture.

In the case in which an inter-block separator is incorrect, it is possible to resynchronize the decoding with the encoding by means of the binary word representing the rank of the block, modulo 4.

There are at least 4 possibilities of detecting an error in a block, at inter-block separator level:

by detecting an inter-block separator before having detected the two intra-block separators contained in any normal block;

by detecting an inter-block separator whose beginning does not correspond with the end of the data of the preceeding block, the end of these data being provided by means of a two-bit binary word representing the rank of the block plus the number of events modulo 4;

by detecting a block rank, modulo 4, not equal to the rank of the previous block incremented by 1;

by detecting a sum of a block rank and of a number of events, modulo 4, which is not equal to the sum of the rank of the block and of the the number of events received.

The reception of a block is only validated if none of these conditions occurs. Experience shows that the use of the rank of the block, modulo 4, and of the sum of the rank of the block and of the number of events, modulo 4, which are transmitted in the inter-block separators, enables a large majority of errors affecting the blocks to be detected.

When a block is detected as being incorrect, the method then consists in masking it by replacing it with the similar block in the frame which immediately precedes the frame being decoded. It should be noted that an isolated error in an inter-block separator gives rise to the masking of the block which precedes it and the block which follows it, since the end of the first and the start of the second are not correctly identifiable.

The most annoying type of error is constituted by packets of errors affecting at least four consecutive blocks, because in this case is it not possible to resynchronize the decoding with the encoding since the rank of the block is transmitted modulo 4. All of the following blocks, in the same picture, are shifted. The synchronization is only regained at the start of the next picture. Furthermore, the error propagates over the following images in the blocks encoded by inter-image encoding. It is possible to increase resistance to errors of the inter-block separators by increasing the modulo of the word representing the rank of the block and of the word representing the sum of the rank of the block and the number of events.

Figure 2:
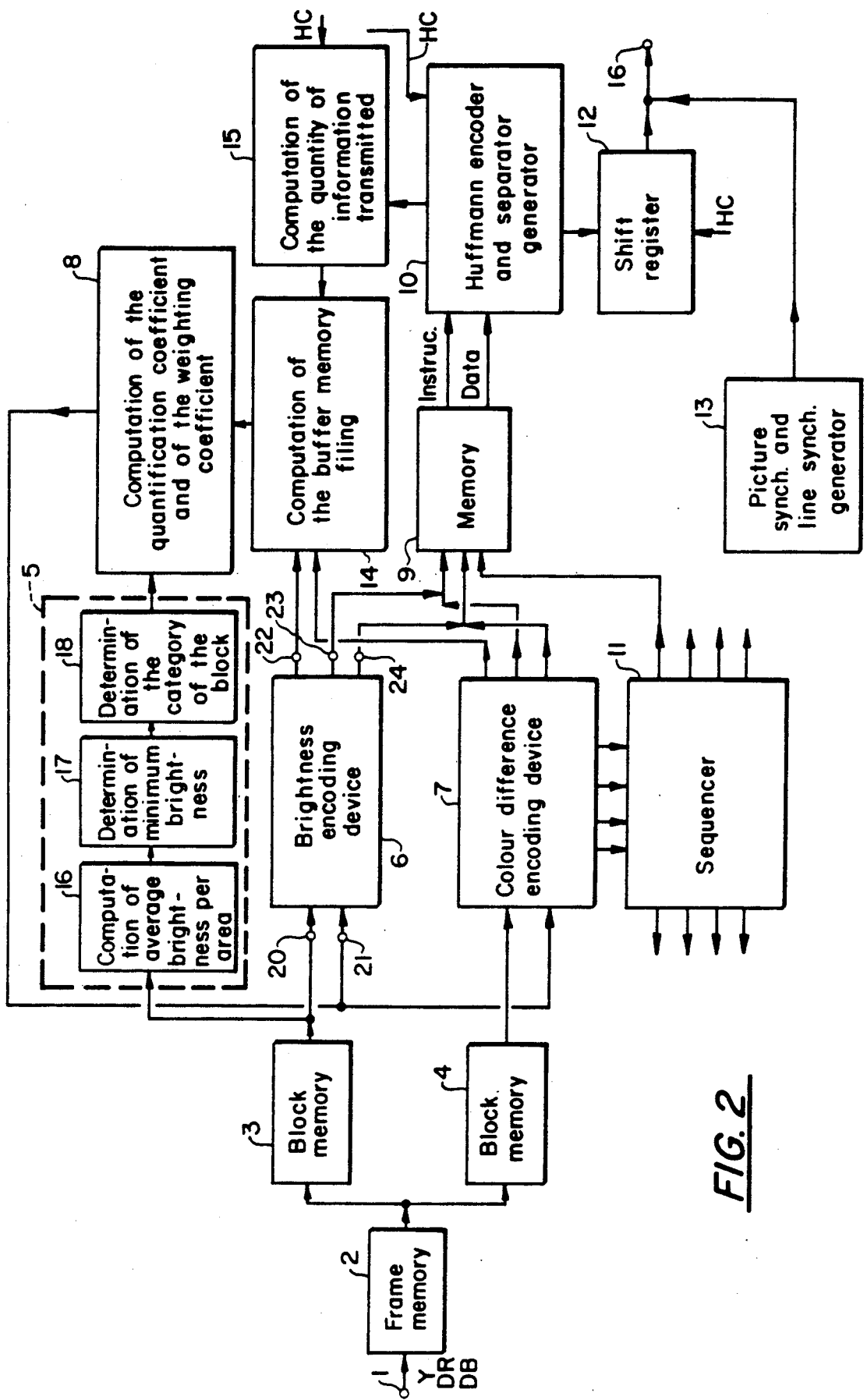
FIGS. 2 and 3 show the block diagram of an embodiment of an encoding device comprising a synchronization device for the implementation of the method according to the invention.

FIG. 2 shows the block diagram of an embodiment of an encoding device including a synchronization device for the implementation of the method according to the invention. This example comprises: an input terminal 1; a frame memory 2, a first and a second block memory 3 and 4, a device 5 for the classification of the blocks; a brightness encoding device 6; a colour difference encoding device 7; a device 8 for computing the quantification coefficient and the weighting coefficient; a memory 9; a Huffmann encoder and separators generator device 10; a sequencer 11, a shift register 12; a picture synchronization and line synchronization generator 13; a device 14 for computing the filling of the buffer memory, constituted by the memory 9, the device 10 and the register 12; a device 15 for computing the quantity of transmitted information; and an output terminal 19 connected to an asynchronous transmission channel having a constant data rate of 10 Mb per second.

The input terminal 1 receives in parallel a brightness value Y, a red colour difference value DR, and a blue colour difference value DB in the form of a triplet of binary words. Each triplet represents an element of a picture. The series of pictures concerned is a conventional series of television pictures in which each picture is constituted from two interlaced frames but these two frames are independently encoded. The brightness signal is sampled at the frequency of 10.125 MHz and each of the colour difference signals is sampled at a frequency of 5.06 MHz. The encoding devices 6 and 7 operate in parallel. While the device 6 encodes two brightness values, the device 7 encodes a red colour difference value and a blue colour difference value.

A data input of the frame memory 2 is connected to the input terminal 1. Read and write control inputs of this memory 2 are connected to the outputs of the sequencer 11 by links which are not shown. The sequencer 11 controls the storage of the values Y, DR, DB, as they become available. A data output of the memory 2 is connected to data inputs of the block memories 3 and 4. Control inputs of the memories 3 and 4 are connected to outputs of the sequencer 11 by links which are not shown. The sequencer 11 controls the reading from the memory 2 and the writing into the memory 3 of 16×16 brightness values representative of a block of 16×16 picture elements. It simultaneously controls the reading from the memory 2 and the writing into the memory 4 of 8×16 red colour difference values and of 8×16 blue colour difference values representative of the same block of picture elements.

A data output of the block memory 3 is connected to an input terminal 20 of the device 6 and to an input of the classification device 5. A data output of the memory block 4 is connected to an input of the device 7. Another input of the device 7 and an input 21 of the device 6 are connected to an output of the device 8. The device 8 supplies the value of a quantification coefficient and of a weighting coefficient, calculated in order to regulate the data flow of the encoded information transmitted on the transmission channel. The device 8 has a first input connected to an output of the classification device 5, and a second input connected to an output of the computing device 14. The device 14 has a first input connected to an output of the device 15, a second input connected to an output terminal 22 of the device 6 and a third input to a first output of the device 7.

The memory 9 has: a first data input connected to an output terminal 23 of the device 6 and to a second output of the device 7; a second data input connected to an output terminal 24 of the device 6 and to a third output of the device 7; and a third data input connected to an output of the sequencer 11.

The function of the memory 9 is the store the values of cosine transformation coefficients or of cosine transformation coefficient differences, or the length of the sequences of zeroes, representing the brightness values or the colour difference values in order to enable a regulation of the data rate of the encoded information sent on the channel. The data received by the first data input of the memory 9 are transformation coefficient values or transformation coefficient difference values or lengths of sequences of zeroes. The data received by the second data input of the memory 9 are indicators corresponding to the data applied to the first data input, in order to indicate the type of encoding, inter-or intrapicture, and the type of data: data corresponding to brightness values or to a red colour difference or to a blue colour difference, and indicating their coefficients or differences of coefficients which are not zero on the one hand, and the length of the sequences of zeroes on the other hand.

The data received by the third data input of the memory 9 also correspond to the data received by the first input and indicate the start of a block or, within a block, the start of the brightness data, or the start of the red colour difference data or the start of the blue colour difference data. These two indicators are stored in the memory 9 at the same time as a datum representing the brightness or a colour difference and constitute an instruction for controlling the device 10, a Huffmann encoder and generator of separators, in order to encode the data according to 8 distinct Huffmann trees, and in order to supply the inter-block separators, the intrablock separators and the inter-picture separators. The memory 9 has two outputs respectively connected to two inputs of the device 10 in order to supply it in parallel with a datum and a corresponding instruction.

The memory 9 also has read and write control inputs respectively connected to outputs of the sequencer 11 by links which are not shown. The sequencer 11 controls the reading of data and of the corresponding instructions progressively as the device 10 encodes and transmits these data on the channel. The device 10 indicates to the sequencer 11 its availability by a link which is not shown.

The device 10 has an output connected to a parallel input of the shift register 12. The register 12 has an output connected to the output terminal 16 of the encoding device and has a control input receiving the clock signal HC which defines the transmission frequency on the channel. The picture synchronization and line synchronization generator 13, has an output also connected to the output terminal 14 in order to supply synchronization patterns at picture frequency and at line frequency. The generator 13 is controlled by the sequencer 11 by means of a link which is not shown. The transmission of the synchronization patterns is performed completely independently from the transmission of the encoded data and their separators while periodically freezing the transmission of these encoded data in order to transmit the synchronization patterns. The patterns will enable, after the decoding, the recovery of the picture and line frequencies which are asynchronous with respect to the channel frequency.

The device 10 is essentially constituted by a sequencer and by read only memories. The read only memories enable the performance of a transcoding from data supplied by the memory 9; this transcoding is a function of the type of data and the type of data is indicated by the instruction accompanying them. The sequencer is controlled by these instructions to select a read only memory corresponding to Huffmann code appropriate to the data to be transcoded. The sequencer also supplies the binary words constituting the inter-block separators, the intra-block separators and the picture separators. This sequencer comprises counters for determining the rank of each picture separator, the rank of each block, modulo 4, and the sum of the rank of each block and of the number of events encoded in this block, modulo 4, in order to include these values in the separators, according to the previously described method.

The sequencer 11 supplies clock signals to all of the components of this encoding device and it provides in particular control signals to the devices 6 and 7 with a period corresponding to the processing of a block of 16×16 picture elements. It should be noted that the values representative of the picture elements are stored in the frame memory 2 with stop time intervals corresponding to the line suppression and to the frame suppression. But these representative values are re-read from the memory 2 at a slightly slower rate, such that the reading is performed at a regular rate without taking account of the line suppression and frame suppression time intervals.

An output of the device 10 is connected to a parallel input of the shift register 12 to provide it with a binary word corresponding to an encoded datum or to a separator. The shift register 12 transmits the bits of this binary word successively to the output terminal 19 under the effect of the clock HC which corresponds to the transmission frequency on the channel in question.

The device 8 supplies a weighting coefficient which is the same for the brightness encoding device 6 and for the colour difference encoding device 7; and it supplies a quantification coefficient which is the same, except for the application of a multiplication factor, for the devices 6 and 7. These two coefficients therefore provide a common regulation for the data rate of the information to be transmitted corresponding to the brightness and for the information to be transmitted corresponding to the colour differences. The memory 9 stores both of these types of information to be transmitted together with indicators enabling these different types of information to be identified and constituting instructions for controlling the device 10.

As the memory 9 is placed upstream of the Huffmann encoder 10, the regulation of the flow of bits on the channel consists in fact in acting on the amplitude of the coefficients or coefficient differences, by the variable weighting and quantification, before encoding them by means of a Huffmann encoder. A reduction in the amplitude is represented by a reduction in the number of bits at the output of the Huffmann encoder. Everything happens as if there were, instead of the memory 9, the device 10 and the register 12, only a buffer memory storing the binary data in series and restoring them in series on the channel. The device 14 in fact computes, not the filling of the memory 9, but the filling of this buffer memory. The filling of the buffer memory is equal to the quantity of binary information, in the form of Huffmann codes, remaining to be transmitted at the time in question. There is no mathmetical relationship between the filling of the memory 9 and the filling of the buffer memory. Consequently, the capacity of the memory 9 is chosen by considering the average length of the Huffmann codes. In this example, the average length is equal to two bits. The memory 9 has a capacity of 32K words, each word being constituted by a datum and an instruction, and corresponds to a capacity of 64K bits for the buffer memory as defined before.

The device 15 supplies to the device 14 the value of the quantity of information transmitted on the channel. The devices 6 and 7 supply to the device 14 the cost of encoding each coefficient or difference of coefficients. The device 14 computes the value of the filling of the buffer memory by accumulating the costs of encoding and by subtracting the transmitted quantity. Then it supplies the value of the filling to the computing device 8 which determines a quantification coefficient and a weighting coefficient, by modulating the severity of the quantification and of the weighting as a function of the category of the block determined by the device 5.

The device 8 can be constituted by a microprocessor and a memory programmed to perform the computing operations described below. The programming of these computing operations is a conventional task within the capabilities of those skilled in the art.

The weighting enables the exploitation of the fact that a quantification error in the coefficients corresponding to the high spatial frequencies does not result in much degradation in the decoded picture. On the other hand, a quantification error in the coefficients corresponding to the high (sic) spatial frequencies of the picture results in a poor restitution of the decoded picture. The weighting is such that the coefficients corresponding to the low spatial frequencies are favoured. The weighting coefficient, for the brightness, is computed by the device 8 according to the following formula:

$$P^{lum}(u,v) = \exp\left[-\frac{R \cdot u^2 + v^2}{Pon^2 \cdot Nor}\right] \quad (1)$$

where u and v are respectively the index of the column and of the line of the coefficient or of the difference of coefficients to which the weighting applies; where R depends on the sampling frequency of the picture, its value being 1.4 for a sampling frequency of 10.125 MHz and for a block of size 16×16; where Nor is a constant parameter but depending on R and which is given by the following formula:

$$Nor = \frac{2 \times 16^2}{R \times 16^2 + 16^2} \quad (2)$$

Nor=0.42 for a sampling frequency of 10.125 MHz; and where Pon is a variable parameter which defines the severity of the weighting. Its value depends on the filling of the buffer memory storing the encoded information to be transmitted, corresponding to the three types of signal representing the picture elements. This information is the information relating to the blocks preceding the block of picture elements being encoded. The number of bits in question is that obtained after the Huffmann encoding of the non-zero values, the encoding by sequences of zero values, and after insertion of data separating words. The severity of the weighting is an increasing function of the filling of the buffer memory, in order to act against this filling.

In this example of implementation, the capacity of the buffer memory is 64 kilobits. The value of the parameter Pon, and the weighting ratio obtained, between the high and the low spatial frequencies of the picture are given in the following table.

| Filling of buffer memory | Value of the Pon parameter | Value obtained for the high/low frequency weighting ratio |
|---|---|---|
| 64 to 48 Kb | 18 | 5 |
| 48 to 40 Kb | 18.5 | 4.5 |
| 40 to 32 Kb | 19 | 4 |
| 32 to 24 Kb | 20 | 3.5 |
| 24 to 16 Kb | 22 | 3 |
| 16 to 8 Kb | 24 | 2.5 |
| 8 to 0 Kb | 27 | 2 |

This table is stored in a read only memory incorporated in the device 8.

The value of the coefficients or of the differences of the transformation coefficients for the colour difference signals, is weighted by a coefficient given by the formula:

$$p^{ch}(u,v) = \exp - \left[ \frac{R' \cdot \left(\frac{U}{2} + 1\right)^2 + v^2}{Pon^2 \cdot Nor'} \right] \quad (3)$$

where R' is a constant which depends on the size of the block and of the sampling frequency for the colour difference signal and which is equal to 0.7 for blocks of 16×8 and for a sampling frequency of 5.0625 MHz; and where Nor' is a constant which is given by the following formula:

$$Nor' = \frac{2 \times 16^2}{R' \times 16^2 + 16^2} \quad (4)$$

Nor'=0.59 for a sampling frequency of 5.0625 MHz.

The weighting coefficient $P^{ch}(u, v)$ is also a function of the filling of the buffer memory, by means of the variable Pon, in order to participate in the process of regulation of the data rate of the transmitted encoded information. The weighting coefficient is the same for the data encoded by the inter-picture encoding and for those encoded by the intra-picture encoding.

The method of regulation furthermore consists in multiplying the value of the coefficient or of the differences of transformation coefficients of a block by a quantification coefficient which is a function of the filling of the buffer memory, the latter containing the encoded data corresponding to the blocks preceding the block being encoded.

The quantification operation is performed in parallel on the transformation coefficients obtained by the intra-picture encoding and on the differences of transformation coefficients obtained by the inter-picture encoding, after the weighting operation. For a given block of picture elements, all of the coefficients and all of the differences of transformation coefficients corresponding to the brightness are multiplied by the same quantification coefficient value. All of the coefficients and all of the differences of transformation coefficients corresponding to the two colour difference signals are multiplied by a weighting coefficient which has the same value as that corresponding to the brightness, except for the application of a constant multiplication factor. This constant is equal to 1.41 in order to compensate for a constant multiplication factor introduced during the computation of the cosine transforms and which is slightly different for blocks of different sizes, as is the case for the brightness on the one hand and for the colour differences on the other hand.

The quantification coefficient is constant for a filling $E_b$ of the buffer memory, less than a threshold value; it is exponentially decreasing when the filling $E_b$ is above this threshold value. In this example, in which the capacity of the buffer memory is equal to 64,000 bits, the filling threshold value is taken as equal to 56,000 bits. For the brightness, the quantification coefficient is given by the following formula:

$$N^{lum} = \exp\left(-\frac{E_b - 56000}{Nor}\right) \quad (5)$$

if $E_b$ is greater than or equal to 56000 bits $N^{lum} = 1$ if $E_b$ is less than 56,000 bits.

For the colour difference signals, the quantification coefficient is given by the following formula:

$$N^{chr} = 1.41 \cdot \exp\left(-\frac{E_b - 56000}{Nor'}\right) \quad (6)$$

if $E_b$ is greater than or equal to 56000 bit $N^{chr} = 1.41$ if $E_b$ is less than 56,000 bits where the constants Nor and Nor' have the previously defined values.

The values of the coefficients or of the differences of transformation coefficients are truncated after the weighting and the quantification in order to round them to the closest whole value.

The counting device 15 determines the number of transmitted bits, from the clock signal HC which indicates to it the rate of transmission on the channel, which is known and constant but which is asynchronous with respect to the sampling frequency of the pictures. The value of the weighting ratio of the high frequencies with respect to the low frequencies corresponds to the values shown in FIG. 2. The brightness quantification coefficient has a constant value for a buffer memory filling varying from 0 to 56 Kb and then decreases exponentially for a filling varying from 56 Kb to 64 Kb.

The device 5 comprises, in series, between its input and its output: a device 16 for computing the average brightness in the peripheral areas of each block of picture elements; a device 17 for determining the minimum brightness in each block; and a device 18 for determining the category of a block.

The device 16 computes the average brightness in 12 sub-blocks of 4×4 picture elements, at the periphery of each block, then computes the average brightness in 12 areas of 4×8 elements, each area being constituted by two adjacent sub-blocks. The device 17 determines the minimum value from among the average values computed by the device 16. The device 18 compares this average value with the 7 fixed threshold values and derives from this a binary word whose value can vary between 0 and 7 and which constitutes the category number of the block, representing the difficulty of encoding and of restoration of this block. The device 5 is controlled by the sequencer 11 by means of links which are not shown. The device 5 can be produced in the form of a hard-wired logic circuit or in the form of a microprocessor and a program memory. In both cases, its embodiment is within the scope of those skilled in the art.

Figure 3:
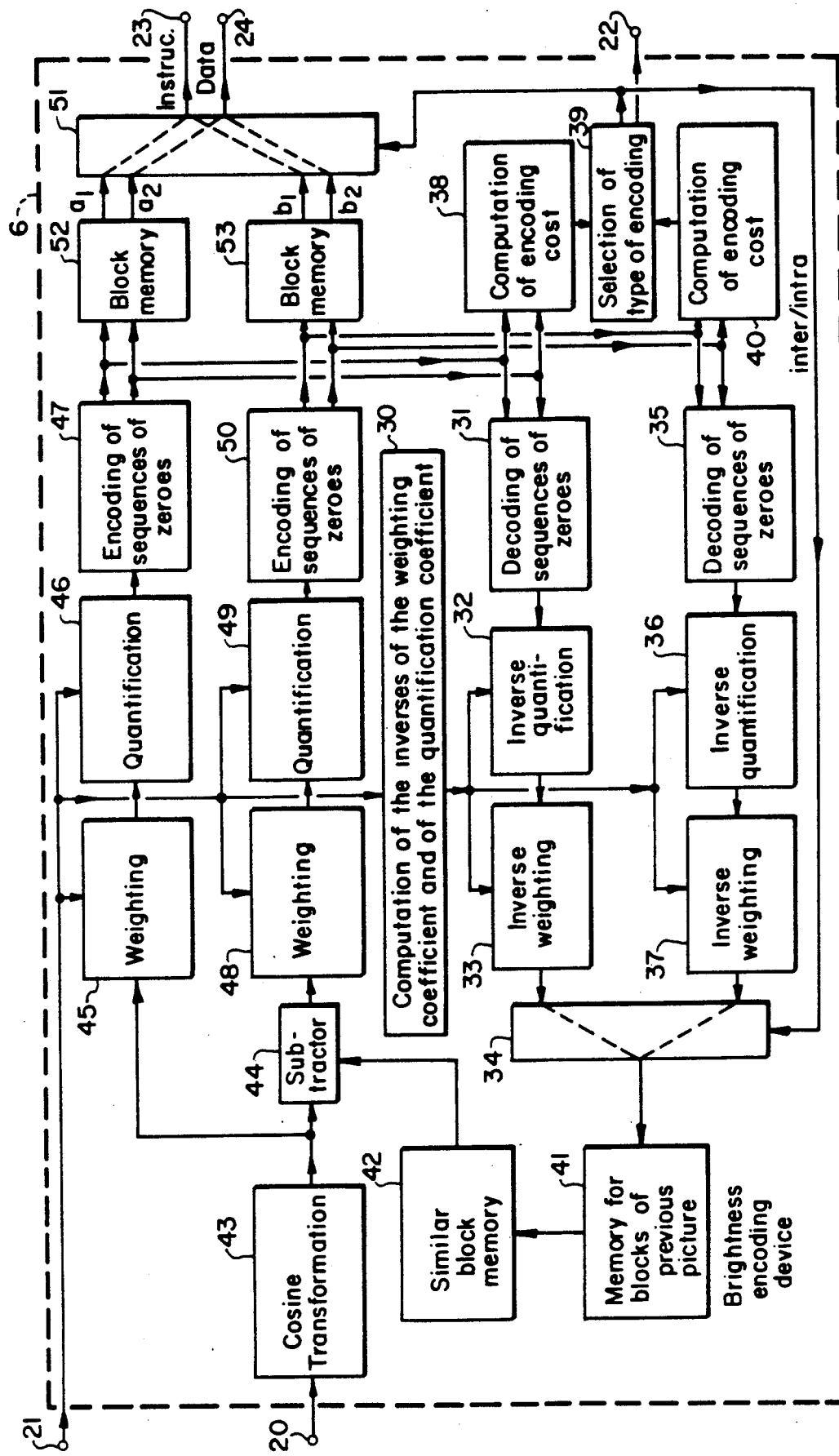

FIG. 3 shows the block diagram of the brightness encoding device 6. The device 7 has an entirely similar block diagram. In this embodiment the device 6 comprises: a device 43 for computing a two-dimensional cosine transformation over blocks of size 16×16. The device 43 has an input connected to the input terminal 22 in order to receive successively the brightness values corresponding to a picture block. The two-dimensional transformation is computed in two stages corresponding to two mono-dimensional transformations, implementing the known Beyong Gi Lee algorithm. The device 43 can be embodied for example according to the description given in the French Patent Application No. 2,581,463.

The encoding device 6 furthermore comprises means enabling the computation in parallel of the transformation coefficient of a block of brightness values and the differences between these values and the transformation coefficient of the similar block in the previous frame. It performs the operations of weighting, quantification and encoding of sequences of zeroes, in parallel on the coefficients and on the differences of transformation coefficients.

The transformation coefficients computed by the device 43 are successively processed by a weighting device 45, a quantification device 46; and a device for encoding the sequences of zeroes 47. The latter has a first output and a second output respectively supplying encoded data and an indicator indicating the type of data supplied, i.e.: the value of a transformation coefficient or length of a sequence of zeroes. These two outputs are respectively connected to two inputs of a memory 52 intended for storing data and the corresponding indicators, for a block of picture elements encoded according to the intra-image encoding method. The memory 52 has two data outputs respectively connected to two inputs $a_1$ and $a_2$ of a multiplexer 51, in order to provide it with a data word and an indicator word respectively.

The device 6 also comprises a subtracter 44 having a first input connected to the output of the device 43 in order to receive the value of a transformation coefficient and having a second input connected to an output of a memory 42 storing the values of the transformation coefficients of the block similar to the one being processed but in the frame encoded immediately previously. The subtracter 44 therefore computes the difference between a transformation coefficient and the similar transformation coefficient in the preceding frame. This difference is then successively processed by a weighting device 48, a quantification device 49, and a device 50 encoding sequences of zeroes. The device 50 has two outputs respectively supplying an encoded datum constituted by a difference of transformation coefficients or by a length of sequences of zeroes, and supplying an indicator corresponding to the type of data.

These two outputs are respectively connected to data inputs of the block memory 53, intended for storing data and the corresponding indicators for a block of picture elements encoded according to the inter-picture encoding method. The memory 53 has two data outputs respectively connected to two inputs $b_1$ and $b_2$ of the multiplexer 51 in order to supply it with a data word and an indicator word respectively, the latter constituting an instruction for controlling the device 10.

The multiplexer 51 has a control input connected to an output of a device 39 for selecting the type of encoding. It also has two outputs respectively connected to the output terminals 23 and 24 of the device 6 in order to supply respectively an instruction and a data word constituted by a transformation coefficient value, or a value of length of a sequence of zeroes. Depending on the value of a control signal supplied by the device 39, the multiplexer 51 connects the inputs $a_1$ and $a_2$ respectively to its two outputs or connects the inputs $b_1$ and $b_2$ respectively to its two outputs, depending on whether the encoding to be performed is of the intra-picture type or of the inter-picture type respectively.

The weighting devices 45 and 48, and the quantification devices 46 and 49 have control inputs connected to the input terminal 21 of the device 6 in order for each of them to receive a binary word respectively defining the weighting coefficient and the quantification coefficient applied to the transformation coefficients and to the differences of transformation coefficients of the brightness values. The input terminal 21 is also connected to an input of a device 30 for computing the inverse of the weighting coefficient and the inverse of the quantification coefficient.

The device 6 furthermore comprises a device 31 for decoding sequences of zeroes corresponding to the transformation coefficients, this device 31 having two inputs respectively connected to the two outputs of the device 47, and having an output supplying either a non-zero transformation coefficient supplied by the first output of the device 47, or a sequence of zero values, depending on the value of the indicator supplied by the second output of the device 47. The zero or non-zero transformation coefficient values supplied by the device 31 are then successively processed by an inverse quantification device 32 and by an inverse weighting device 33 and are then supplied to a first input of a multiplexer 34.

The device 6 furthermore comprises a device 35 for decoding the sequences of zeroes corresponding to differences of transformation coefficients, having two inputs respectively connected to the first output and to the second output of the device 50 for respectively receiving data, constituted by differences of transformation coefficients or lengths of sequences of zeroes, and indicators indicating the type of these data. The device 35 transmits the non-zero transformation coefficient differences without modifying them, and it supplies a sequence of zero values in order to restore the sequences of zero transformation coefficient differences. These transformation coefficient difference values are supplied by an output of the device 35 and are successively processed by an inverse quantification device 36 and by an inverse weighting device 37 and are then applied to the second input of the multiplexer 34.

The inverse weighting devices 33 and 37, and the inverse quantification devices 32 and 36 have control inputs connected to an output of the device 30 in order to receive respectively the inverse weighting coefficient and the inverse quantification coefficient corresponding to the brightness values of the block being processed, which are computed by the device 30. The multiplexer 34 has an output which is connected either to its first input or to its second input, depending on the value of a binary signal applied to a control input which is connected to the output of the encoding type selection device 39. The output of the multiplexer 34 is connected to a data input of a memory 41 storing the values of the transformation coefficients of all of the picture element blocks of the frame having been processed immediately previously.

A data output of the memory 41 is connected to a data input of a memory 42 storing only the transformation coefficients of the block in the previous frame which is similar to the block of picture elements being processed. The memories 41 and 42 have write and read control inputs connected to outputs of the sequencer of 11 by links which are not shown. A data output of the memory 42 is connected to the second input of the subtracter 44 in order to supply it with the value of the transformation coefficients of the similar block, in an order corresponding to the order of transformation coefficients computed by the device 43, this order for example being the zigzag order shown in FIG. 1. The memory 42 and the memory 41 act as a digital delay line providing a one-frame delay.

The device 6 furthermore comprises a device 38 for computing the cost of intra-picture encoding and a device 40 for computing the cost of inter-picture encoding, for a same block of picture elements. The device 38 has two inputs respectively connected to the two outputs of the device 47 and has an output connected to an input of the device 39 for selecting the type of encoding. The device 40 has two inputs respectively connected to the two outputs of the encoding device 50 and has an output connected to another input of the device 39. The devices 38 and 40 compute a cost of encoding taking account of the inter-block, the intra-block and inter-picture separators; and taking account of the Huffmann code words used for encoding each transformation coefficient, each difference of transformation coefficient, and each sequence of zeroes. The selection device 39 therefore simultaneously receives two binary words indicating the cost of encoding by intra-picture encoding and by inter-picture encoding.

The device 39 determines which is the lowest cost and in principle selects the type of encoding corresponding to this cost. But it can also impose an intra-picture encoding. The device 39 has a first output connected to the control inputs of the multiplexers 34 and 51 in order to command the inter-picture or the intra-picture encoding; and it has a second output connected to the output terminal 22 in order to supply the cost of encoding of the block. This cost is used for computing the filling of the virtual buffer memory.

In order to compare the encoding costs and for imposing the intra-picture encoding in certain cases, the device 39 can be constituted by a microprocessor and a read only memory containing a program corresponding to the implementation of this method.

The process of forcing comprises three criteria. A first criterion consists: in computing the difference between the cost of intra-picture encoding and the cost of inter-picture encoding; then in dividing this difference by the cost of the inter-picture encoding; then in comparing the result with a first variable threshold value. This first threshold value is computed by counting the number $N(i,j)$ of blocks having the coordinates $(i,j)$ and having been encoded by an inter-picture encoding since the last time that a block of coordinates $(i,j)$ was encoded by an intra-picture encoding; then in computing a function of $N(i,j)$, divided by a constant. This function can be $N^2(i,j)$, for example.

A second forcing criterion consists in comparing the number $N(i,j)$ with a second threshold value, $N_0$, which is fixed at 30 for example. The encoding is forced to be an intra-picture encoding when $N(i,j)$ exceeds 30.

A third criterion, intended to stagger the forcing operations in time, consists in comparing the number of the block in question, in the picture in question, with a value $N_1$ modulo 4. The value $N_1$ is an integer value varying from 0 to 3 and changing at each frame.

The production of this computing program for a microprocessor is within the capabilities of those skilled in the art.

Figure 4:
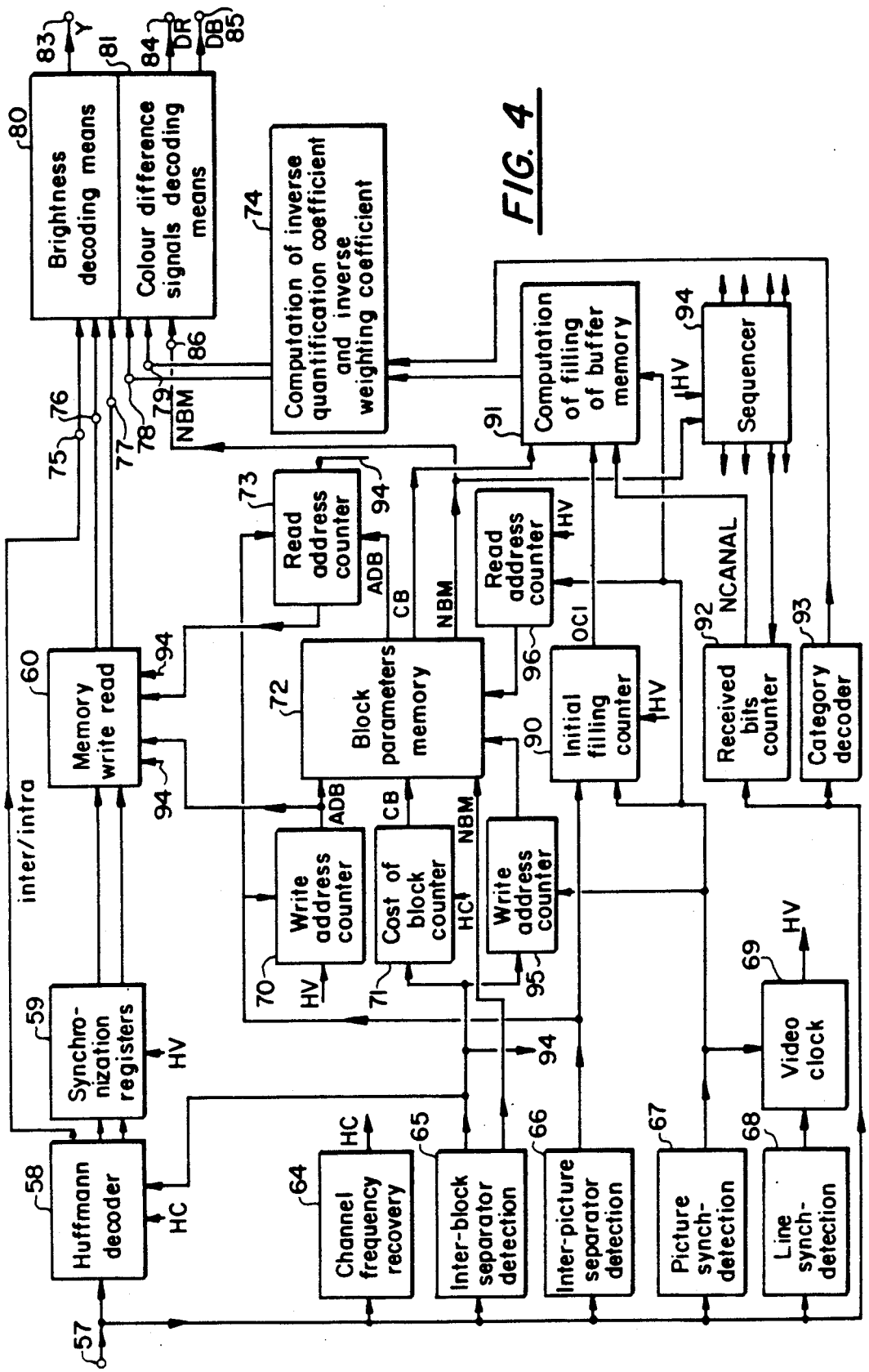

FIG. 4 is the block diagram of an embodiment of a picture decoder for the implementation of the method according to the invention. This example comprises: an input terminal 57 connected to a transmission channel; a Huffmann decoder 58; a set 59 of synchronization registers; a memory 60; means of decoding the brightness 80, means of decoding the colour difference signals 81; a device 64 for recovery of the channel frequency; a device 65 for detecting the inter-block separators; a device 66 for detecting the inter-picture separators; a device 67 for detecting the picture synchronization patterns; a device 68 for detecting the line synchronization patterns; a clock 69 at the video signals frequency; a counter 70 of write addresses of the buffer memory; a counter 71 of the cost a block; a memory 72 for storing the parameters of a block; a counter 73 of read addresses of the buffer memory; a device 74 for computing the inverse quantification coefficient and the inverse weighting coefficient; a counter 90 of the initial filling; a counter 91 for computing the filling of the buffer memory constituted by the memory 60, the decoder 58, and the registers 59; a counter 92 of the number of bits received; a category decoder 93; a sequencer 94; a counter 95 of write addresses of the parameters memory; a counter 96 of read addresses of the parameters memory; and three output terminals, 83 to 85, respectively supplying a brightness value Y, a red colour difference value DR, and a blue colour difference value DB.

The device 67 for detecting the picture synchronization patterns and the device 6B for detecting the line synchronization patterns have inputs connected to the input terminal 57 and have outputs respectively connected to the two inputs of the clock 69. The clock 69 supplies a clock signal HV which will determine the frequency of the brightness values, and of the colour difference values restored by the decoder.

The sequencer 94 supplies control signals to all of the components of the decoding device in synchronism with the video clock signal. For purposes of simplification, this block diagram shows only one type of video clock signal, referenced HV, but there are in fact several video clock signals having frequencies which are submultiples of the sampling frequency of the brightness signal. The production of the clock signals is within the capabilities of those skilled in the art.

The device 64 for recovering the channel frequency has an input connected to the input terminal 57 and has an output supplying a clock signal HC corresponding to the frequency of the bits transmitted on the channel. This clock signal is applied in particular to a clock input of the counter 71 counting the cost of a block in order to count the number of bits corresponding to each block received.

The Huffmann decoder 58 has an input, connected to a transmission channel by the input terminal 57, for receiving a series of binary values at a constant rate of 10 Mb per second, this series being transmitted by an encoding device such as described previously. It also has a clock input receiving the clock signal HC, and a synchronization input connected to a first output of the inter-block separator detection device 65. The latter supplies a signal which re-initializes the decoder 58 at the start of the transmission of the encoded data of each block. The decoder 58 can only decode a code word corresponding to an event if it has correctly decoded the code word corresponding to the preceding event. In the case of a transmission error, the Huffmann decoder remains unsynchronized until the detection of the next inter-block separator.

The device 65 has an input connected to the input terminal 57 in order to receive the transmitted bits and to (sic) an input connected to an output of the decoder 68 (sic) in order to receive a logic signal each time that the decoder 58 has decoded an event.

The function of the device 65 is to recognize each inter-block separator by means of the pattern constituting the radical, and to check the absence of transmission error by means of the two binary words which follow the radical. For this purpose, it compares the rank of the block, modulo 4, transmitted in the inter-block separator, and the rank of the block counted according to the number of previously received separators. Furthermore the device 65 checks the number of code words received, i.e., the number of events in the previous block, by comparing the transmitted value of the sum of the rank of the block and the number of events, modulo 4, with the sum computed from the number of previosly detected blocks and from the number of previously detected events, modulo 4. An inter-block separator is recognized as valid by the device 65 when it is followed by two other inter-block separators verifying these two conditions.

When one of these three verifications gives a negative result, a second output of the detection device 65 supplies a masking command constituted by a binary word NBM indicating the number of blocks to be masked, to a first input of the memory 72. The association of this error detection and the process of masking erroneous blocks enables erroneous transmission to be remedied in most cases.

In general, error correcting devices, adapted to the type of channel, are respectively interposed between the output terminal 19 of the encoding device and the input terminal 57 of the decoding device. These devices are conventional and are not shown in the figures. They enable the correction of small packets of errors, by means of a small redundancy of transmitted bits. The checks performed by the inter-block spearators detection device 65 enable the detection of the errors which remain. The latter can be serious for the restored picture because they can falsify not only the brightness or the colours of a block but can affect the position of the whole of the block if an inter-block separator is not recognized. The checking of the rank of each inter-block separator and the checking of the number of decoded events enables a precise computation of the number NBM of blocks to be masked and therefore enables them to be masked and enables the restoration of an image having a such better quality than if the blocks were restored in inaccurate positions.

The first output of the device 65 is also connected to a zero reset input of the counter 71 for counting the cost of a block; to a clock input of the counter 95 of write addresses of the memory 72; and to an input of the sequencer 94 by means of a link which is not shown.

When an inter-block separator is valid, the binary signal supplied by the first output of the device 65 reinitializes the Huffmann decoder 58, resets to zero the counter 71 counting the cost of a block, increments the write address counter 95 by one unit, and initiates the sequencer 94 such that it commands a writing, in the memory 72, of the parameters of the block which is recognized as valid. The parameters written into the memory 72 are: the address, ADB, of writing the first word of the encoded data of the block, in the memory 60; the cost of this block, CB, i.e. the number of bits between the two inter-block separators enclosing the data; and the value of MBN which is equal to the number of blocks possibly to be masked, this number being zero when there are no blocks to be masked. These three parameters are respectively supplied by the output of the write address counter 70 of the buffer memory; the output of the counter 71 counting the cost of a block; and by the third output of the inter-block separator detecting device 65. These three outputs are respectively connected to three data inputs of the memory 72. The latter has first, second and third data outputs for respectively restoring the value of these three parameters. It also has read and write control inputs connected to outputs of the sequencer 94 by links which are not shown.

When an inter-block separator is recognized as valid, the sequencer 94 controls a writing in the memory 72 for storing the parameters of the block which follows this separator. The write address counter 95 has an output connected to a write address input of the memory 72 in order to supply it with a write address for the parameters each time that an inter-block separator is validated. When one or more inter-block separators are not recognized as valid, a single set of parameters is written in the memory 72 for the data of several blocks, and everything happens as though the data corresponded to a single block. These data are stored in the buffer memory 60 even if they are incorrect, and they are read from the memory 60, but they are not used for restoring a picture. The counter 95 also has a zero reset input connected to the output of the picture synchronization detection device 67 in order to be reset to zero at the start of each picture.

The output of the write address counter 70 is also connected to a write address input of the buffer memory 60. An input for loading the read address counter 73, is connected to the first data output of the memory 72 in order to receive a start of block address, ADB; and has an output connected to a read address input of the buffer memory 60. The counter 70 has a clock input receiving the video clock signal HV, and has a zero reset input connected to the output of the device 67. The output of the device 47 is also connected to a zero reset input of the read address counter 73 of the buffer memory. The counter 73 has a clock input connected to an output of the sequencer 94 by a link which is not shown.

The second output of the memory 72 is connected to an input of the device 91 computing the filling of the buffer memory in order to supply it with cost of a block, CB. The third output of the memory 72 is connected to an input of the sequencer 94 and to an input terminal 86 of the means 80 and 81 for supplying them with the value of the number of blocks to be masked, NBM.

The Huffmann decoder 58 has a first output and a second output respectively connected to two inputs of registers 59 which are called synchronization registers as they enable the synchronization of the encoded data with the video clock HV, while the Huffmann decoder 58 operates at the channel clock frequency HC. The decoder 58 has a third output supplying an encoding seletion binary signal: inter-picture encoding or intra-picture encoding, to an input terminal 75 of the means 80 and 81. Two outputs of the synchronization registers 59 are respectively connected to two data inputs of the buffer memory 60, respectively corresponding to encoded data and to a binary instruction word indicating the type of encoded data. The buffer memory 60 has a first output and a second output respectively connected to input terminals 77 and 76 of the means 80 and 81 in order to supply them respectively with encoded data and a binary instruction word.

The memory 60 also has a write clock input and a read clock input respectively connected to two outputs of the sequencer 94 by links which are not shown. When an inter-block separator has been recognized as valid, the sequencer 94 begins the writing in the memory 60, of the encoded data corresponding to at least one block, at a series of addresses supplied by the counter 70, following the start address of the block ADB, which is the only one stored in the memory 72.

For reading the encoded data stored in the memory 60, the sequencer 94 commands, for each block or group of blocks (if an error has been detected):

a reading, from the memory 72, of the address ADB corresponding to the start of the block;

a loading of this address into the read address counter 73;

a reading at the address ADB, in the buffer memory 60, the address ADB having been supplied to the read address input by the counter 73;

a series of incrementations of the content of the counter 73;

a series of readings, from the buffer memory 60, at addresses supplied by the counter 73.

As the memory 60 is placed downstream of the Huffmann decoder 58, everything occurs as if, instead of the decoder 58 and the memory 60, there were a buffer memory storing in series the binary data transmitted by the channel and restoring them in series. The computing device 91 in fact computes the filling of this buffer memory, which is not related mathematically to the filling of the memory 60 as the latter contains binary words supplied by the Huffmann decoder. The filling of the buffer memory is equal to the quantity of binary information, in the form of Huffmann codes, which remains to be decoded at the instant in question. The capacity of the memory 60 is identical to the capacity of the memory 9 of the encoding device and is sufficient in all cases. In this example it is equal to 32K words, each word being constituted by a datum and an instruction.

The device 74 for computing the quantification coefficient and the weighting coefficient has two outputs respectively connected to input terminals 78 and 79 of the means 80 and 81, and has two inputs respectively connected to an output of the computing device 91 and to an output of the category decoder 93. The computing device 91 has a first input connected to the second data output of the memory 72, supplying a binary word CB which is the cost of encoding a block; a second input connected to an output of the initial filling counter 90, supplying a value OCI; a third input connected to an output of the counter 92, supplying the number of bits received NCANAL; and a fourth input, a zero reset input, connected to an output of the picture synchronization detection device 67.

The initial filling counter, 90, has a clock input receiving the video clock signal HV; a stop input connected to the output of the inter-picture separator detection device 66; and a zero reset input connected to the output of the picture synchronization pattern detection device 67. The counter 90 counts the number of bits supplied by the channel to the buffer memory, between the instant at which a picture synchronization pattern is detected and the instant at which an inter-picture separator is detected. The result of this count constitutes the value of the initial filling OCI of the buffer memory, at the start of each picture.

The counter 92 of the number of received bits has an input connected to the input terminal 57 and an input connected to an output of the sequencer 94. The counter 42 measures the exact number of bits received by the buffer memory since the start of a block, this number not being known in advance in an accurate way as the channel is asynchronous. The counter 92 is reset to zero by a signal supplied by the sequencer 94, in principle at the start of reception of each block, but the sequencer 94 skips one or more zero resets when the binary word NBM is not zero, i.e. when there is at least one block to be masked. For example, if there are two blocks to be masked, the sequencer 94 only commands a zero reset of the counter 92 at the end of the second masked block.

The category decoder 93 has an input connected to the input terminal 57 for decoding a binary word indicating a category and located just after each inter-block separator. It supplies this binary word to the computing device 74 which takes it into account for computing the quantification coefficient and the inverse weighting coefficient in the same way as the device for computing the quantification and weighting coefficients in the previously described encoding device.

The device 74 for computing the inverse quantification coefficient and the inverse weighting coefficient operates in a similar way to the device 30 computing the quantification coefficient and the weighting coefficient, but in addition it performs the computation of the inverse of the quantification coefficient and the inverse of the weighting coefficient obtained by the formulae (3) to (8).

In these formulae the filling of the buffer memory of the encoding device is replaced by a value which is equal to a constant less the filling of the buffer memory of the decoding device. In fact, the sum of the filling of these two buffer memories is equal to a constant when the regulation is correctly operating in the encoding device and the decoding device, the consequence of this regulation being that each encoded datum undergoes a constant delay between the instant at which it enters into the buffer memory of the encoding device and the instant at which it leaves the buffer memory of the decoding device, since the data rate of the channel is constant. This delay corresponds to the constant value of the sum of the two fillings.

This constant is determined by measuring the initial filling OCI of the buffer memory of the decoding device, by means of the initial filling counter 90, which measures the number of bits entering into the device 58 between the instant at which the device 67 detects the picture synchronization pattern, which is transmitted independently from the flow of encoded data, and the instant at which the device 66 detects the presence of an inter-picture separator in the encoded data arriving at the input of the device 58. The maintaining of the complementary nature of the filling of the two buffer memories enables the inverse quantification coefficient and the inverse weighting coefficient to be computed exactly in the decoder. No information representing the filling of the buffer memory is sent in clear on the transmission channel and consequently this information is not disturbed by the errors.

FIG. 5 shows the more detailed block diagram of the brightness decoding means 80. The means 81 have a similar block diagram and are used alternately for decoding the red colour difference signals and blue colour difference signals. The means 80 comprise: an inverse quantification device 101; an inverse weighting device 102; three multiplexers 103 to 105, each having two inputs and one output; a memory 106 storing a block of transformation coefficients; an adder 107, a sequencer 108; a register 109 for storing a similar coefficient; a memory 110 for storing the blocks of similar coefficients in the frame preceding the current frame; a device 111 for decoding the sequences of zeroes; a frame memory 112; and a device 113 for computing the two-dimensional inverse cosine transforms.

The device 101 has a data input connected to the data input 77 which receives encoded data supplied by the buffer memory 60, and has a control input connected to the input terminal 78 which receives the value of an inverse quantification coefficient computed by the device 74. An output of the device 101 is connected to an input of the device 102. The latter also has an input connected to the input terminal 79 in order to receive the value of an inverse weighting coefficient computed by the device 74, and has an output connected to a first input of the multiplexer 103. The multiplexer 103 has a second input continuously receiving a zero value, and has an output which is connected either to the first input or to the second input depending on the value of a binary signal applied to a control input, connected to an output of the device 111.

The device 111 decodes the sequences of zeroes from the data and from an instruction, applied respectively to a first input and to a second input which are respectively connected to the input terminal 77 and to the input terminal 76 of the means 80. The output of the multiplexer 103 therefore supplies the value of a coefficient or a difference of transformation coefficients. It is connected to a first input of the multiplexer 104 and to a first input of the adder 107. A second input of the adder 107 is connected to an output of the register 109 which supplies it with the value of the transformation coefficient similar to the coefficient being decoded and occurring in the picture preceding the picture being decoded.

The output of the adder 107 therefore supplies the value of a transformation coefficient when its first input receives the value of a difference of transformation coefficients. This output is connected to the second output of the multiplexer 104. The multiplexer 104 has a control input connected to the input terminal 75 in order to receive the value of a control bit selecting an inter-picture decoding or an intra-picture decoding, and it has an output connected to a first input of the multiplexer 105. A second input of the multiplexer 105 is connected to the output of the register 109 in order to receive the value of the similar coefficient to the coefficient being decoded. A control input of the multiplexer 105 is connected to an output of the sequencer 108 in order to receive possibly a masking control signal. When this masking signal is applied to the multiplexer 105, the latter transmits the value of the similar coefficient supplied by the register 109 instead of transmitting the value of the transformation coefficient supplied by the multiplexer 104.

The output of the multiplexer 105 is connected to a data input of the memory 106. The memory 106 has write and read control inputs respectively connected to outputs of the sequencer 108, the latter commanding the memory 106 to store all the transformation coefficients of a block before commanding the inverse cosine transformation of the coefficients. The sequencer 108 has an input receiving the video clock signal HV, an input connected to the input terminal 76 in order to receive an instruction depending on the type of data to be decoded and an input connected to the input terminal 86 in order to receive the value NBM of the number of blocks to be masked. If NBM=0 the sequencer 108 does not command the masking. If NBM is other than 0, the sequencer 108 commands the masking of the indicated number of blocks.

The memory 110 has a data input connected to a data output of the memory 106 in order to store all of the blocks of the transformation coefficients resulting from the decoding of a frame in order to be able to supply the similar coefficients to the transformation coefficients of the following frame. The memory 110 has a data output connected to a data input of the register 109, and has read and write control inputs connected to the outputs of the sequencer 108.

The data output of the memory 106 is also connected to an input of the computing device 113. The latter has a zero reset input connected to an output of the sequencer 108, and has an output connected to a data input of the picture memory 112. The frame memory 112 has a read and write control input connected to outputs of the sequencer 108 and has a data output connected to the output terminal 83 of the decoder, in order to supply a series of brightness values Y. The frame memory 112 has the function of restoring the series of brightness values in the conventional scanning order of a frame while the computing device 113 supplies the decoded brightness values in the order of division of the blocks in the frame. The embodiment of the computing device 113 for performing the inverse cosine transformations is conventional. It can be embodied according to the description in the French patent application No. 2,581,463.

The scope of the invention is not limited to the examples of embodiment described above and numerous variant embodiments are within the capabilities of those skilled in the art.

We claim:

1. Synchronization method for transmission, on an asynchronous channel, of a series of pictures encoded by means of a variable length code, comprising the steps of:

transmitting, in addition to data, separators called inter-block separators for separating the data corresponding to separate blocks of picture elements, and separators called picture separators for separating the data corresponding to successive pictures; and transmitting first synchronization patterns at a picture line frequency and second synchronization patterns at a picture frequency, while interrupting the transmission of the data and the separators; the separators being such that they cannot be imitated by licit concatenations of data and/or separators.

2. Method according to claim 1, characterized in that each picture separator is repeated several times, and comprises a fixed radical followed by a binary word indicating the rank of the separator in the repetitions, modulo a fixed number.

3. Method according to claim 1, characterized in that each inter-block separator comprises a fixed radical and a binary word representing, modulo a fixed number, the rank of a block of picture elements associated with this separator; and furthermore comprises a binary word representing, modulo a fixed number, the sum of this rank and of the number of events which are encoded by the data corresponding to the block associated with this separator.

4. Synchronization device for transmission, on an asynchronous channel, of a series of pictures encoded by means of a variable length code, comprising:

means for inserting a separator called an inter-block separator between two packets of data to be transmitted, corresponding to two distinct blocks of picture elements, and for inserting a separator called a picture separator between two packets of data to be transmitted corresponding to two successive pictures, the separators not being able to be imitated by licit concatenations of data;

means for interrupting the transmission of data and separators, and for inserting synchronization patterns at the picture frequency and at the picture line frequency respectively;

means for recognizing, from among the transmitted data, the picture separators and the inter-block separators and for separating the data corresponding to each block of picture elements; and means for recognizing the synchronization patterns from among the transmitted data and for recovering a clock signal at the picture frequency and a clock signal at the line frequency.

5. Device according to claim 4, characterized in that the means for inserting picture separators, repeat each picture separator several times, constituting it from a fixed radical and causing the radical to be followed by a binary word indicating the rank of the separator in the repetitions, modulo a fixed number; and in that the means for recognizing the picture separators, determine the position of a picture separator, in the series of data, from the position of each radical which is recognized, and as a function of the value of the binary word accompanying each recognized radical.

6. Device according to claim 4, characterized in that the means for inserting inter-block separators comprise means for constituting each inter-block separator from a fixed radical, followed by a first binary word representing, modulo a fixed number, the rank of a block of picture elements associated with this separator; and followed by a second binary word representing, modulo a fixed number, the sum of this rank and of the number of events which are encoded by the data corresponding to the block associated with this separator; and in that the means for recognizing the inter-block separators comprise means for checking that the rank of a recognized inter-block separator corresponds to the value of the first binary word which follows this separator and for checking that the sum of the rank of the recognized separator and of the number of events encoded by the data corresponding to the block associated with the recognized separator corresponds to the value of the second binary word following the recognized separator.

* * * * *